(12) United States Patent
Chang (10) Patent No.: US 8,305,753 B2
(45) Date of Patent: Nov. 6, 2012

(54) ADJUSTABLE MECHANISM AND ELECTRONIC DEVICE HAVING THE ADJUSTABLE MECHANISM

(75) Inventor: Fang-Ta Chang, Taipei Hsien (TW)

(73) Assignee: Wistron Corporation, Taipei (TW)

( * ) Notice: Subject to any disclaimer, the term of this patent is extended or adjusted under 35 U.S.C. 154(b) by 266 days.

(21) Appl. No.: 12/691,092

(22) Filed: Jan. 21, 2010

(65) Prior Publication Data

US 2010/0328859 A1 Dec. 30, 2010

(30) Foreign Application Priority Data

Jun. 30, 2009 (TW) .............................. 98211807 U (51) Int. Cl.
*G06F 1/16* (2006.01)
*B41J 11/56* (2006.01)
*A47B 81/00* (2006.01)

(52) U.S. Cl. .............. 361/679.59; 361/679.55; 400/681; 312/223.1; 312/223.2

(58) Field of Classification Search .......... 361/679.01–679.45, 679.55–679.59; 710/303, 304; 400/681; 312/223.1, 223.2

See application file for complete search history.

(56) References Cited

U.S. PATENT DOCUMENTS

| | | | | |
|---|---|---|---|---|
| 7,746,636 B2 * | 6/2010 | Tang | .................. | 361/679.55 |
| 7,784,752 B2 * | 8/2010 | Tang | .................. | 248/188.8 |
| 7,855,883 B2 * | 12/2010 | Tang | .................. | 361/679.55 |
| 7,990,703 B2 * | 8/2011 | Tang | .................. | 361/679.59 |
| 8,050,032 B2 * | 11/2011 | Trang | .................. | 361/679.59 |
| 2010/0002379 A1 * | 1/2010 | Hadad et al. | .................. | 361/679.59 |

* cited by examiner

*Primary Examiner* — Jayprakash N Gandhi
*Assistant Examiner* — Nidhi Desai
(74) *Attorney, Agent, or Firm* — Turocy & Watson, LLP (57) ABSTRACT

An electronic device includes an adjustable mechanism disposed at a front end of a housing body thereof. The adjustable mechanism includes a foot pad extending through the housing body, and movable relative thereto between a retracted position, where a bottom of the foot pad is higher than that of a docking station, and an extended position, where the bottom of the foot pad is at a same level as that of the docking station. A movable engaging hook is mounted slidably on an inner side of the housing body, and is partially exposed from the housing body. The engaging hook engages the foot pad when the engaging hook is at a limiting position and when the foot pad is at the retracted or extended position, and disengages the foot pad to enable the foot pad to move between the retracted and extended positions when at a free position.

22 Claims, 11 Drawing Sheets

ADJUSTABLE MECHANISM AND ELECTRONIC DEVICE HAVING THE ADJUSTABLE MECHANISM

CROSS-REFERENCE TO RELATED APPLICATION

This application claims priority of Taiwanese Application No. 098211807, filed on Jun. 30, 2009.

BACKGROUND OF THE INVENTION

1. Field of the Invention

The invention relates to an electronic device, more particularly to an electronic device having an adjustable mechanism.

2. Description of the Related Art

Some conventional notebook computers have the functionality of being connectible to a docking station.

Figure 1:
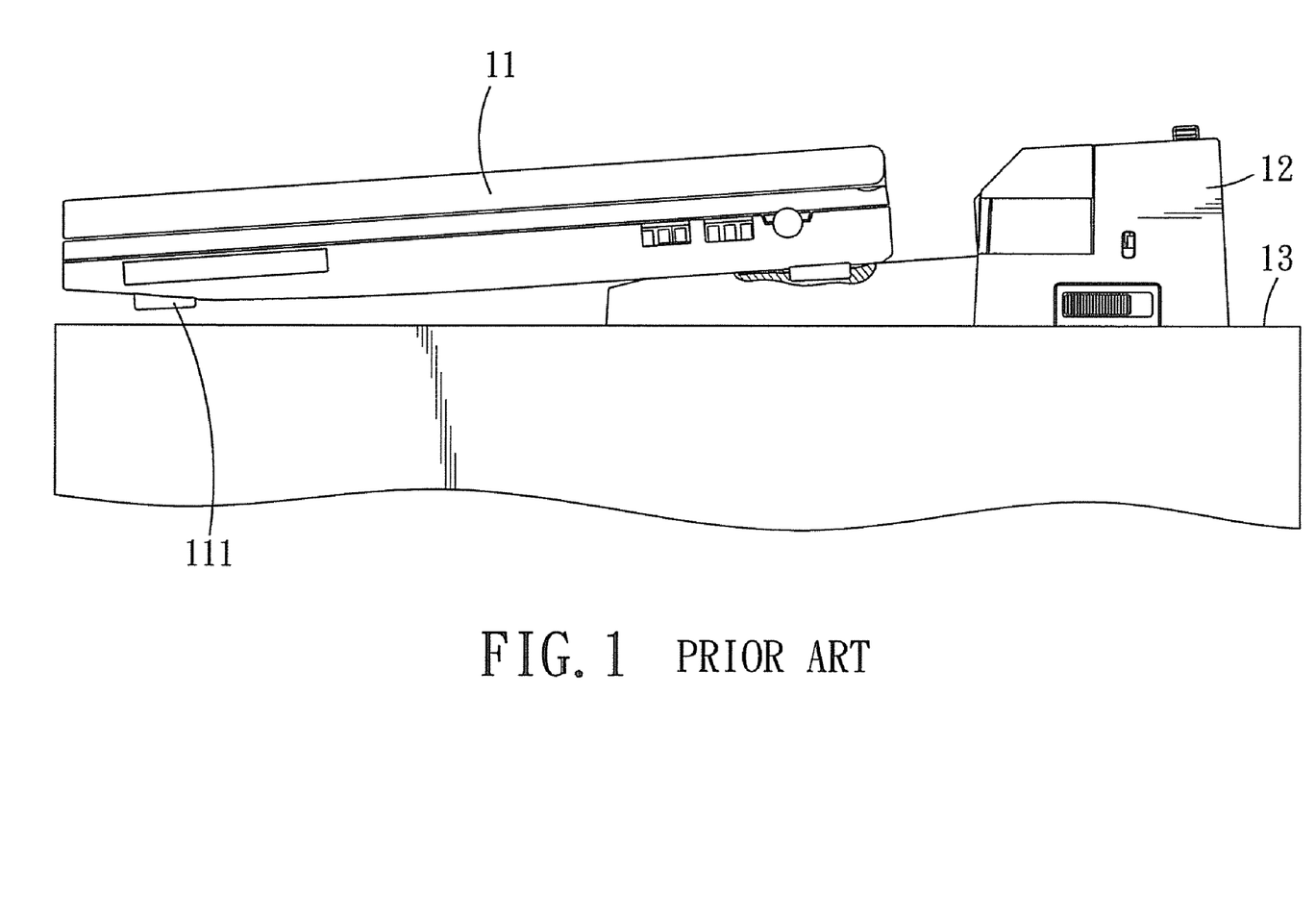
FIG. 1 is a schematic partly cutaway side view of a conventional notebook computer connected to a docking station.

Referring to FIG. 1, when a notebook computer 11 has a rear end thereof connected to a docking station 12 and is placed on a desk surface 13 together therewith, the rear end of the notebook computer 11 is disposed on the docking station 12. Since the docking station 12 has a certain height, and since a front foot pad 111 of the notebook computer 11 has a fixed height, the front foot pad 111 may be suspended in the air and may not come into contact with the desk surface 13, so that the notebook computer 11 is likely to wobble or is unsteady. Hence, there is room for improvement.

SUMMARY OF THE INVENTION

An object of the present invention is to provide an electronic device having an adjustable mechanism.

Another object of the present invention is to provide an adjustable mechanism for a housing body of an electronic device.

Accordingly, an electronic device of the present invention is to be connected to a docking station, and comprises a housing body having a rear end to be disposed on the docking station, and at least one adjustable mechanism disposed at a front end portion of the housing body.

The adjustable mechanism includes a foot pad and a movable engaging hook. The foot pad extends downwardly through the housing body, and is movable upwardly and downwardly relative to the housing body between a retracted position, where a bottom side of the foot pad is at a level higher than that of the docking station, and an extended position, where the bottom side of the foot pad is at a same level as that of the docking station. The movable engaging hook is mounted slidably on an inner side of the housing body, and is partially exposed from the housing body for manipulation. The movable engaging hook is movable horizontally relative to the housing body between a limiting position and a free position. The movable engaging hook is interferingly engaged with the foot pad when the movable engaging hook is at the limiting position and when the foot pad is at either one of the retracted position and the extended position. The movable engaging hook is disengaged from the foot pad when the movable engaging hook is at the free position so as to enable the foot pad to move between the retracted position and the extended position.

Preferably, the movable engaging hook includes a hook body, and two resilient arms connected respectively to left and right sides of the hook body and located respectively at left and right sides of the foot pad. The resilient arms are interferingly engaged with the foot pad when the movable engaging hook is at the limiting position and when the foot pad is at either one of the retracted and extended positions.

Preferably, the foot pad includes a pad body having two first limiting portions formed respectively at left and right sides thereof, and a plurality of stop flanges formed at a top edge thereof. The resilient arms respectively engage the first limiting portions when the foot pad is at the retracted position and when the movable engaging hook is at the limiting position. The stop flanges of the pad body abut against the inner side of the housing body and the resilient arms rest on the top edge of the pad body when the foot pad is at the extended position and when the movable engaging hook is at the limiting position.

Preferably, the movable engaging hook further includes an engaging portion extending from the hook body toward the foot pad and disposed between the resilient arms. The engaging portion is interferingly engaged with the foot pad when the movable engaging hook is at the limiting position and when the foot pad is at either one of the retracted and extended positions.

Preferably, the pad body is formed with a second limiting portion. The engaging portion engages the second limiting portion when the foot pad is at the retracted position and when the movable engaging hook is at the limiting position. The engaging portion rests on the top edge of the pad body when the movable engaging hook is at the limiting position and when the foot pad is at the extended position.

Preferably, the inner side of the housing body is provided with two first beveled portions, and each of the resilient arms is formed with a second beveled portion. The resilient arms are guided to be moved in a direction away from the foot pad so as to be disengaged from the foot pad by virtue of guidance cooperatively provided by the first and second beveled portions when the movable engaging hook is moved from the limiting position to the free position.

Preferably, the adjustable mechanism further includes a biasing member to bias the movable engaging hook to the limiting position.

Preferably, the inner side of the housing body is formed with a stop block. The movable engaging hook further includes a post extending from the hook body in a direction away from the foot pad. The biasing member is sleeved around the post and has two ends respectively abutting against the hook body and the stop block.

Preferably, the inner side of the housing body is provided with a first guiding portion, and the hook body is formed with a second guiding portion to cooperate with the first guiding portion to guide the movable engaging hook to move relative to the housing body.

Preferably, the foot pad further includes a cushioning block connected to a bottom side of the pad body.

Preferably, the pad body is formed with two engaging holes, and the cushioning block is formed with two engaging block portions to respectively engage the engaging holes.

The advantageous effect of this invention resides in that, due to the configuration of the adjustable mechanism, when the rear end of the electronic device is disposed on top of the docking station, the foot pad can be extended downwardly so as to be level with the bottom side of the docking station, and when the electronic device is separated from the docking station and is used independently, the foot pad can be retracted upward. Thus, height adjustment and convenient use can be achieved.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 2:
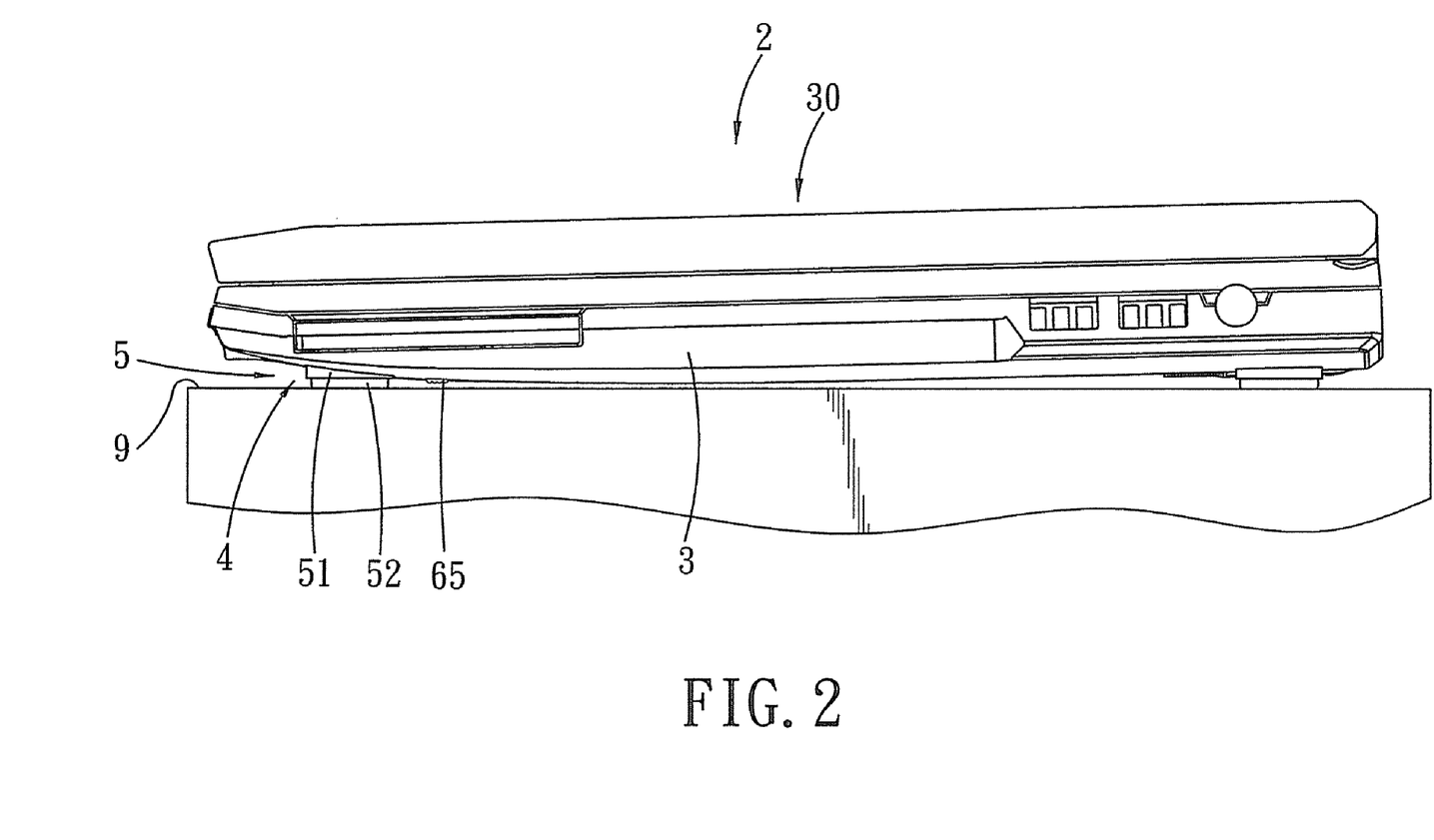
FIG. 2 is a schematic side view of the preferred embodiment of an electronic device having an adjustable mechanism according to the present invention when used independently.
Figure 3:
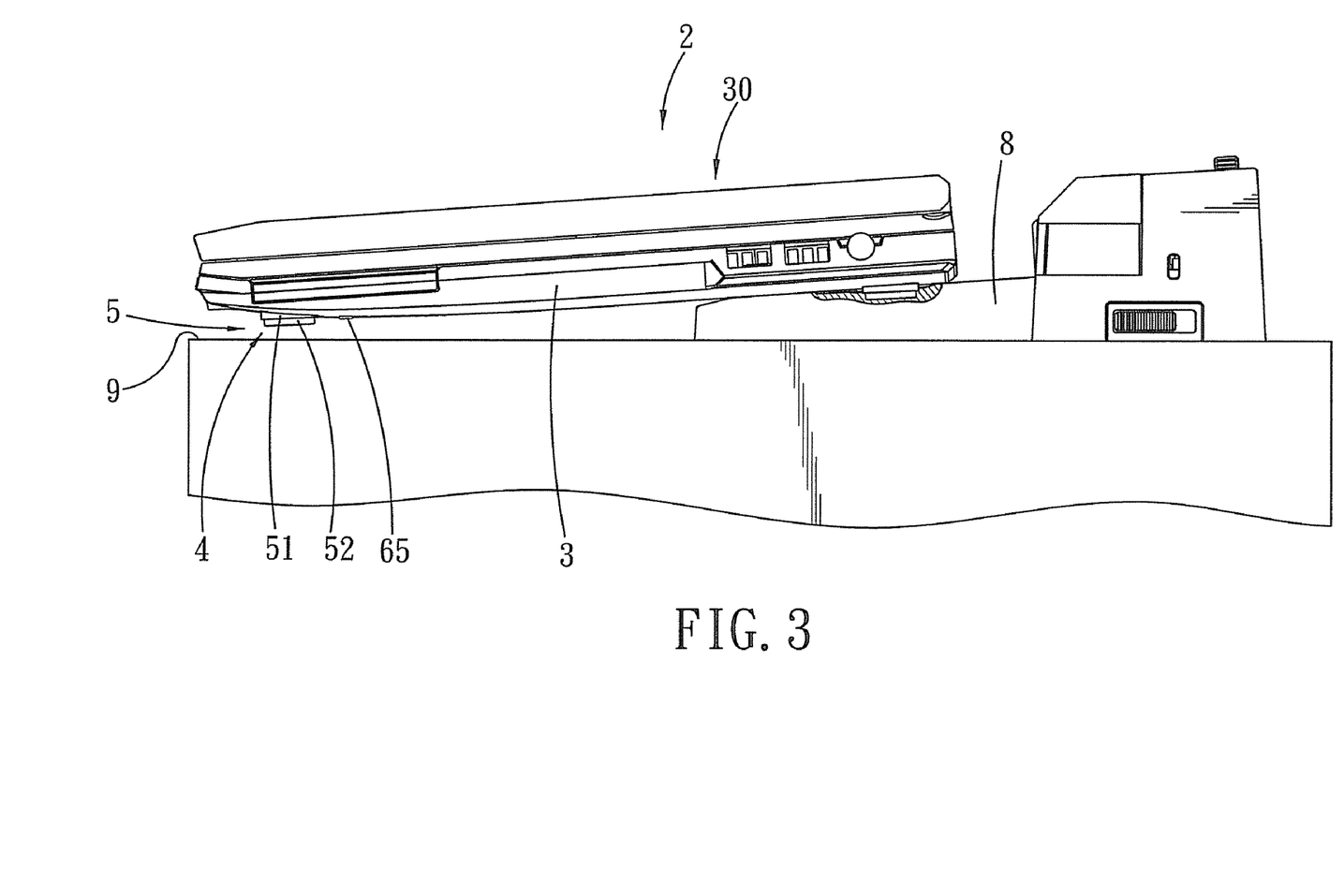
FIG. 3 is a schematic partly cutaway side view of the preferred embodiment when connected to a docking station.
Figure 4:
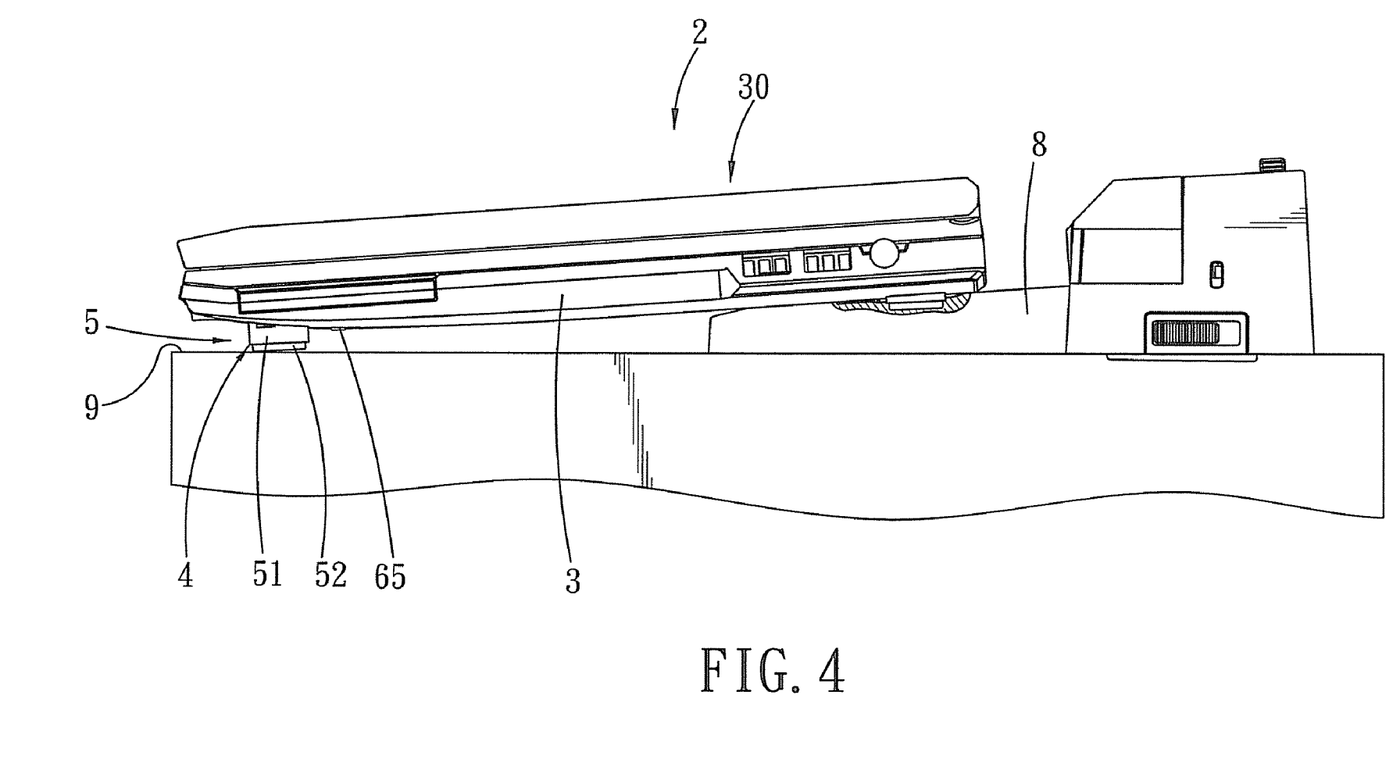
FIG. 4 is a view similar to FIG. 3, but showing a foot pad at an extended position.

Referring to FIGS. 2, 3 and 4, the preferred embodiment of an electronic device 2 having an adjustable mechanism according to the present invention has two states of use. In one state of use, the electronic device 2 is used alone (as shown in FIG. 2). In the other state of use, the electronic device 2 is connected to a docking station 8 (as shown in FIGS. 3 and 4).

The electronic device 2 comprises a device housing 30 that includes a housing body 3, and at least one adjustable mechanism 4 disposed at a front end portion of the housing body 3. The adjustable mechanism 4 includes a foot pad 5 movable upwardly and downwardly between a retracted position (see FIG. 2) and an extended position (see FIG. 4) for height adjustment, which will be described in detail hereinafter. The electronic device 2 in this embodiment is exemplified as a notebook computer, and the housing body 3 is a bottom housing part of the notebook computer.

As shown in FIG. 2, when the electronic device 2 is used alone, the foot pad 5 is disposed at the retracted position so that the electronic device 2 can be placed flat on a desk surface 9. As shown in FIG. 3, when the electronic device 2 is connected to the docking station 8, a rear end of the housing body 3 is disposed on the docking station 8. Since the foot pad 5 is disposed at the retracted position, a bottom side of the foot pad 5 is at a level higher than that of the docking station 8 so that the foot pad 5 is suspended in the air. In this case, the foot pad 5 can be extended downwardly to the extended position as shown in FIG. 4 such that the bottom side of the foot pad 5 is at the same level as that of the docking station 8 and rests on the desk surface 9.

Figure 5:
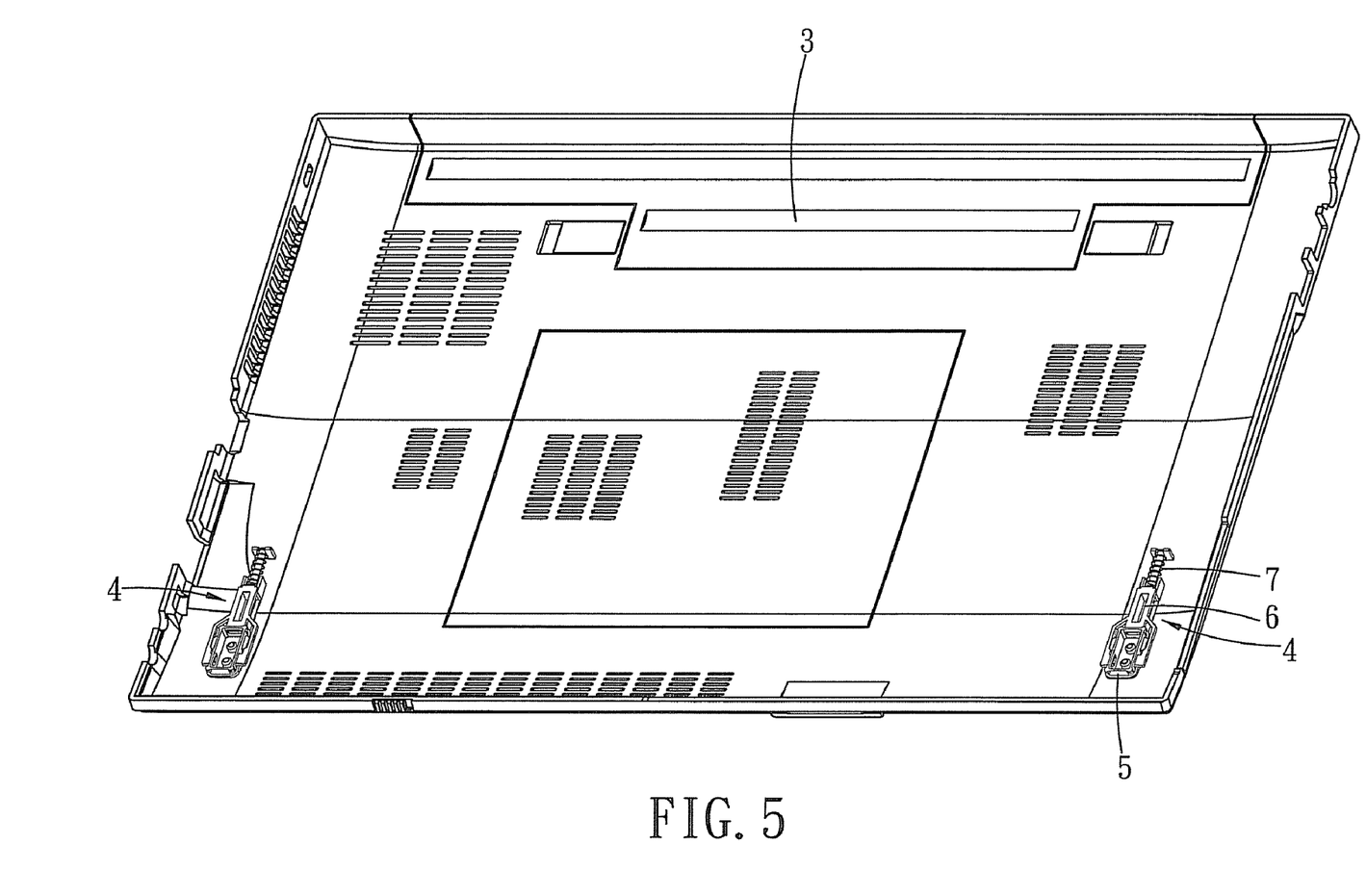
FIG. 5 is a perspective view showing two adjustable mechanisms and a housing body of the preferred embodiment.
Figure 6:
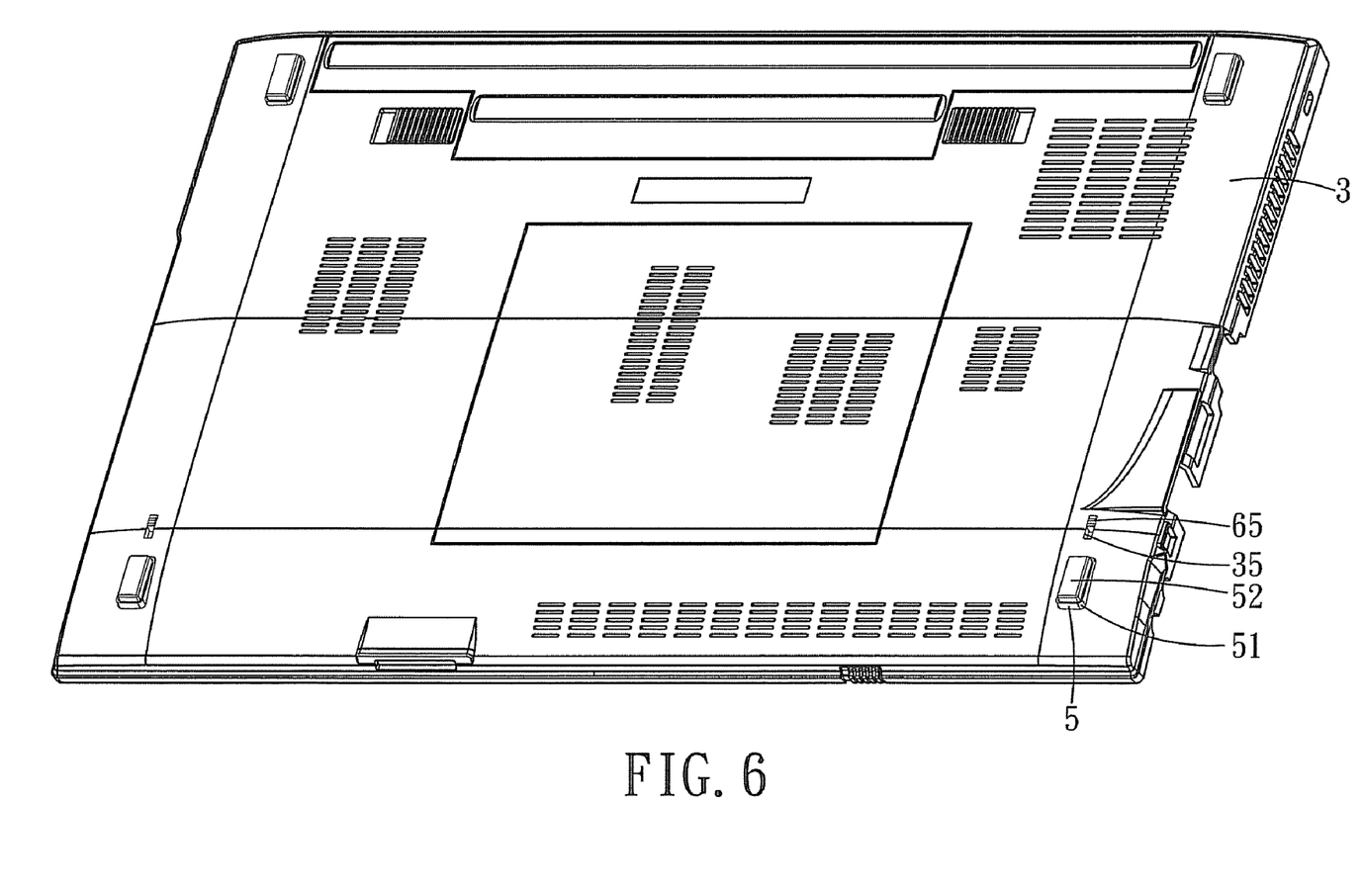
FIG. 6 is a perspective view similar to FIG. 5 but viewed from another angle.

Referring to FIGS. 5 and 6, in this embodiment, two adjustable mechanisms 4 are respectively provided at left and right sides of the front end portion of the housing body 3. Each of the adjustable mechanisms 4 includes a foot pad 5, a movable engaging hook 6, and a biasing member 7. To facilitate description, only one of the adjustable mechanisms 4 will be described in detail hereinafter.

Figure 7:
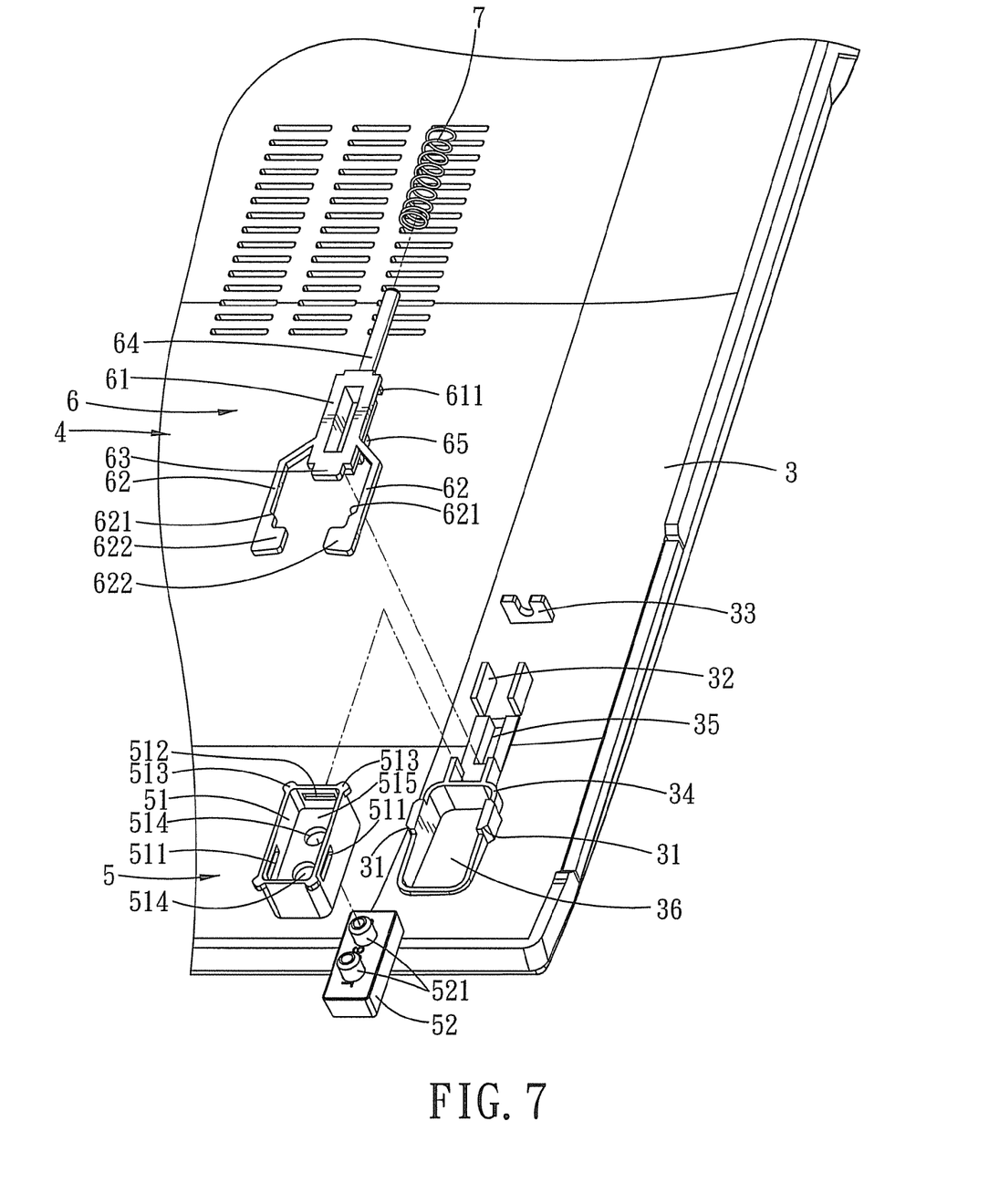
FIG. 7 is a fragmentary exploded perspective view of the preferred embodiment to illustrate the assembly relationship between the adjustable mechanism and the housing body.
Figure 9:
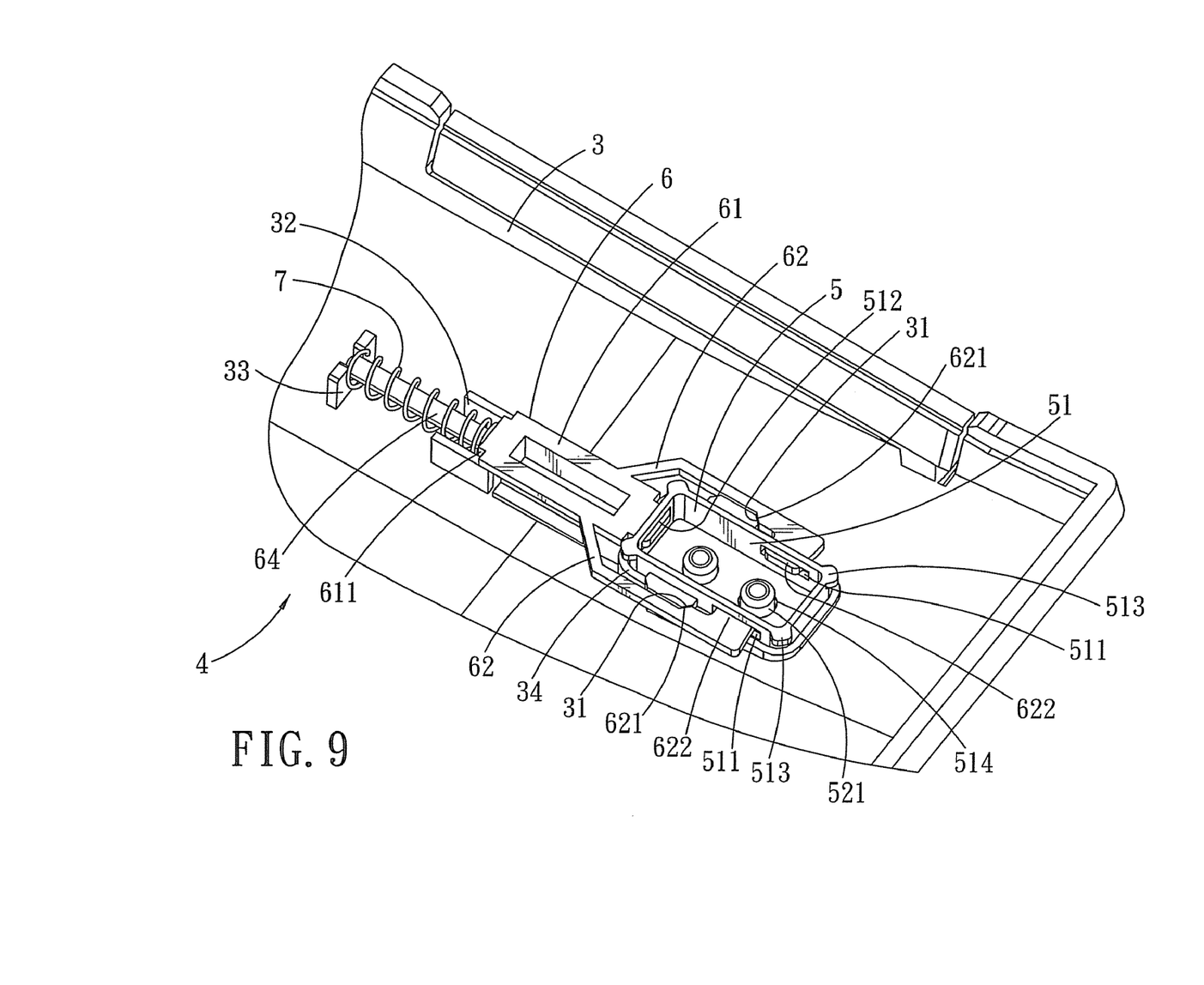
FIGS. 9 to 11 are fragmentary perspective views of the preferred embodiment to illustrate operations of the adjustable mechanism relative to the housing body.

Referring to FIGS. 6, 7 and 9, the footpad 5 extends downwardly through a through hole 36 in the housing body 3, and is movable upwardly and downwardly relative to the housing body 3 between the retracted position and the extended position. The foot pad 5 includes a pad body 51 and a cushioning block 52 connected to a bottom side of the pad body 51.

The pad body 51 is in the form of a block and has a top provided with a recessed portion 515. The pad body 51 has two first limiting portions 511 formed respectively at left and right sides thereof, a second limiting portion 512 formed at a rear side thereof, a plurality of stop flanges 513 formed at a top edge thereof, and two engaging holes 514 formed in a bottom portion thereof. In this embodiment, the first limiting portions 511 and the second limiting portion 512 are slots that extend through the respective sides to be in spatial communication with the recessed portion 515, the stop flanges 513 are four in number and are respectively disposed at four corners of the pad body 51, and the engaging holes 514 are openings extending through the bottom portion of the pad body 51 to be in spatial communication with the recessed portion 515.

The cushioning block 52 is made of rubber material so as to provide better cushioning and shock-absorbing effects. The cushioning block 52 has two engaging block portions 521 projecting from a top side thereof to respectively engage the engaging holes 514 in the pad body 51. It should be noted that, in practice, the pad body 51 and the cushioning block 52 of the foot pad 5 may be bonded together by hot melt adhesive so as to enhance the bonding strength therebetween.

Figure 8:
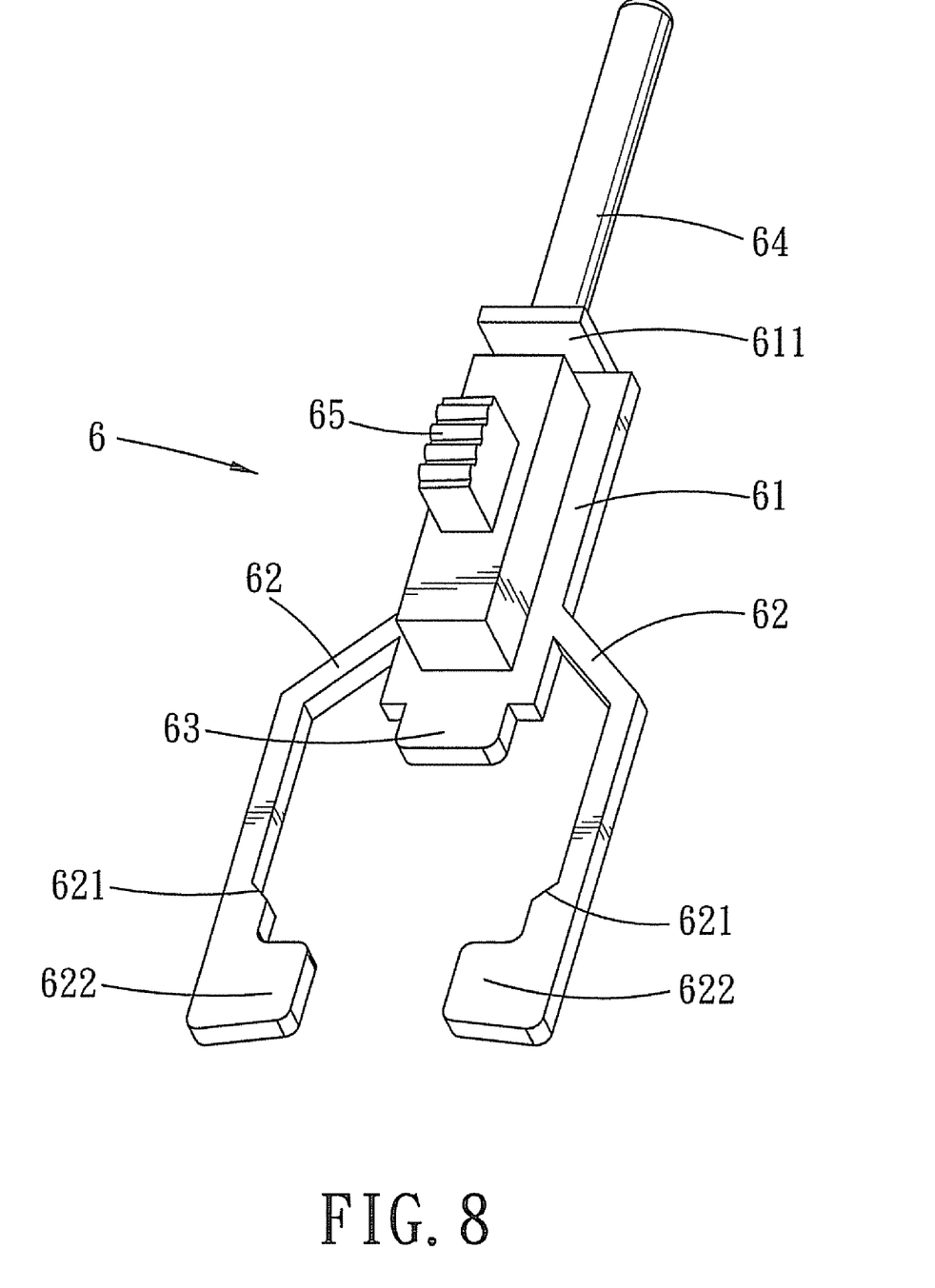
FIG. 8 is a perspective view to illustrate a movable engaging hook of the adjustable mechanism.
Figure 10:
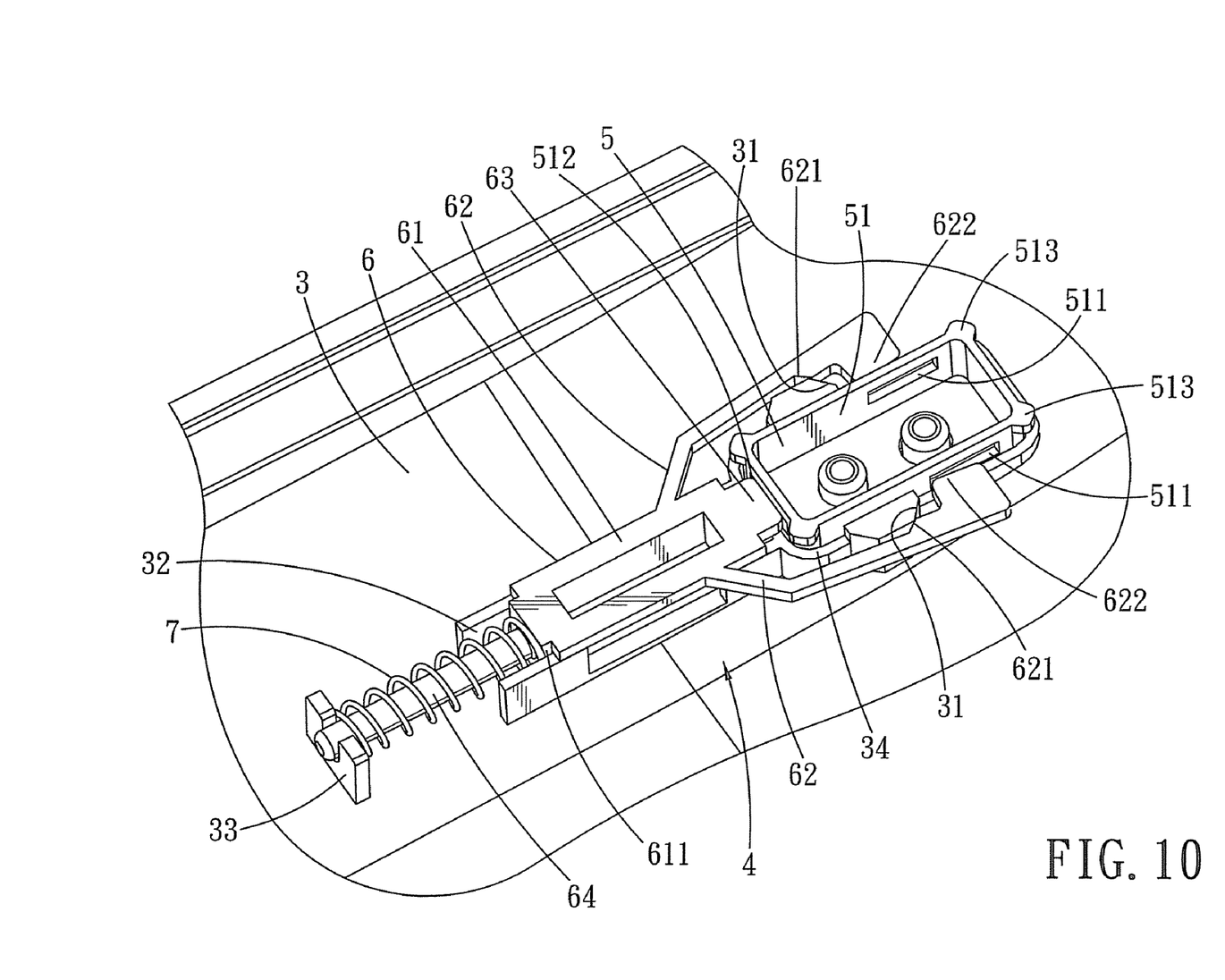
Figure 11:
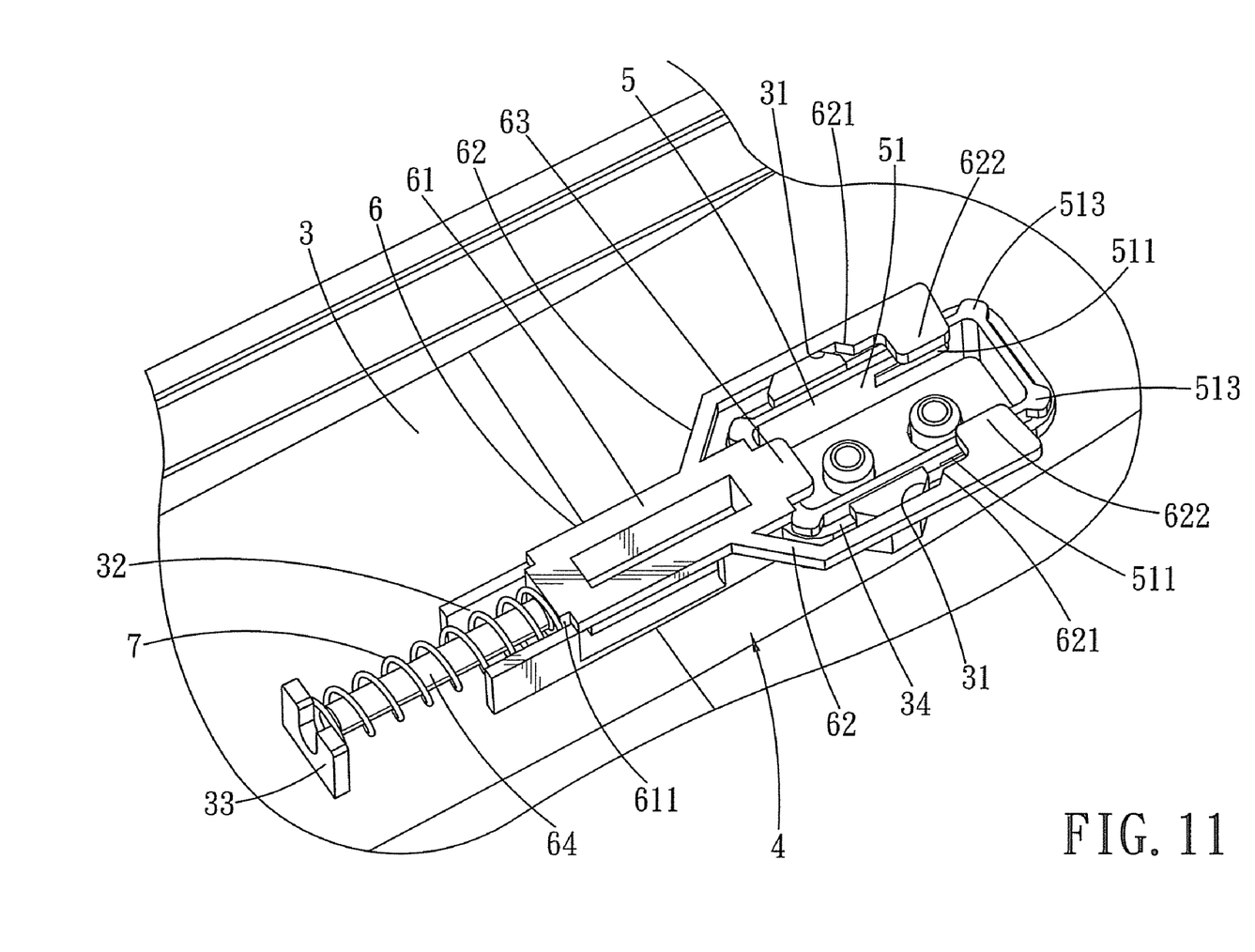

Referring to FIGS. 6, 7 and 8, the movable engaging hook 6 is mounted slidably on an inner side of the housing body 3, and is partially exposed from the housing body 3 for manipulation by a user such that the movable engaging hook 6 is movable horizontally relative to the housing body 3 between a limiting position (as shown in FIGS. 9 and 11) and a free position (as shown in FIG. 10). When the movable engaging hook 6 is disposed at the limiting position and when the foot pad 5 is disposed at either one of the retracted and extended positions, the movable engaging hook 6 is interferingly engaged with the foot pad 5. When the movable engaging hook 5 is disposed at the free position, the movable engaging hook 6 is disengaged from the foot pad 5, so that the foot pad 5 is movable between the retracted and extended positions.

The movable engaging hook 6 includes a hook body 61, two resilient arms 62 that are connected respectively to left and right sides of the hook body 61 and that are located respectively at left and right sides of the foot pad 5, an engaging portion 63 that extends from the hook body 61 toward the foot pad 5 and that is disposed between the resilient arms 62, a post 64 that extends from the hook body 61 in a direction away from the foot pad 5, and an operable portion 65 that is connected to a bottom side of the hook body 61 and that extends outwardly of the housing body 3 through a through slot 35 formed in the housing body 3.

It should be noted that the inner side of the housing body 3 is provided with two first beveled portions 31 which are respectively located at two sides of the through hole 36, and that a segment of each of the resilient arms 62 is formed with a second beveled portion 621. When the movable engaging hook 6 is moved from the limiting position to the free position, by virtue of guidance cooperatively provided by the first and second beveled portions 31, 621, the resilient arms 62 are guided to move in a direction away from the foot pad 5 so as to be disengaged from the foot pad 5.

In addition, a first guiding portion 32 is provided on the inner side of the housing body 3, and the hook body 61 is formed with a second guiding portion 611 that cooperates with the first guiding portion 32 to guide movement of the movable engaging hook 6 relative to the housing body 3. In this embodiment, the first guiding portion 32 is in the form of two parallel plates, and the second guiding portion 611 is a block disposed slidably between the two parallel plates.

The biasing member 7 biases the movable engaging hook 6 for restoring to the limiting position. In this embodiment, a stop block 33 is formed on the inner side of the housing body 3, and the biasing member 7 is a compression spring sleeved on the post 64 and has two ends respectively abutting against the hook body 61 and the stop block 33 so as to provide a resilient restoring force.

Operation of the adjustable mechanism 4 will be described in detail hereinbelow.

Referring to FIG. 9, when the foot pad 5 is disposed at the retracted position and when the movable engaging hook 6 is disposed at the limiting position, engaging blocks 622 of the resilient arms 62 of the movable engaging hook 6 respectively engage the first limiting portions 511 of the foot pad 5, and the engaging portion 63 of the movable engaging hook 6 engages the second limiting portion 512 of the foot pad 5, whereby the movable engaging hook 6 is interferingly engaged with the foot pad 5 at the retracted position.

Referring to FIG. 10, when it is desired to extend the foot pad 5, the exposed operable portion 65 (as shown in FIG. 6) of the movable engaging hook 6 is manipulated so that the movable engaging hook 6 is moved relative to the housing body 3 from the limiting position to the free position by virtue of the configurations of the first guiding portion 32 and the second guiding portion 611. At the same time, due to the provision of the first beveled portions 31 of the housing body 3 that guide the second beveled portions 621 of the resilient arms 62, the resilient arms 62 can be moved in a direction away from the foot pad 5 to result in disengagement of the engaging blocks 622 of the resilient arms 62 of the movable engaging hook 6 from the first limiting portions 511 of the foot pad 5, respectively, and disengagement of the engaging portion 63 of the movable engaging hook 6 from the second limiting portion 512 of the foot pad 5, thereby disrupting the interfering engagement between the movable engaging hook 6 and the foot pad 5. Since the foot pad 5 at this stage is not interferingly engaged with the movable engaging hook 6, the foot pad 5 can move downwardly to the extended position.

Referring to FIG. 11, when the footpad 5 is moved to the extended position, the stop flanges 513 of the pad body 51 rest on top of a rib plate 34 on the inner side of the housing body 3. It should be noted that, since the front end portion of the housing body 3 is inclined as shown in FIG. 7, arrangement of the rib plate 34 provides a level surface for resting of the stop flanges 513 thereon. After the operable portion 65 of the movable engaging hook 6 is released, the movable engaging hook 6 is movable from the free position to the limiting position by virtue of the resilient restoring force of the biasing member 7. At this moment, the engaging blocks 622 of the resilient arms 62 of the movable engaging hook 6 rest on the top edge of the pad body 51, and the engaging portion 63 of the movable engaging hook 6 also rests on the top edge of the pad body 51. Thus, the engaging blocks 622 and the engaging portion 63 cooperate to interferingly engage the foot pad 5 at the extended position.

On the other hand, when it is desired to retract the foot pad 5, it is merely necessary to manipulate the operable portion 65 of the movable engaging hook 6 so that the movable engaging hook 6 is moved from the limiting position to the free position to be released from the interfering engagement with the foot pad 5. Thereafter, the foot pad 5 can be retracted upwardly. After retraction of the foot pad 5, the movable engaging hook 6 can likewise be brought into interfering engagement with the foot pad 5 by virtue of the resilient restoring force of the biasing member 7.

Thus, by virtue of the configuration of the adjustable mechanism 4, extension and retraction of the foot pad 5 can be achieved, so that the foot pad 5 can be retracted when the electronic device 2 is used independently as shown in FIG. 2, and can be extended when the electronic device 2 is connected to the docking station 8 as shown in FIG. 4. Hence, the height of the foot pad 5 can be adjusted depending on the state of use of the electronic device 2.

In summary, with the configuration of the adjustable mechanism 4, when the rear end of the electronic device 2 is disposed on top of the docking station 8, the foot pad 5 can be extended downwardly so as to be level with the bottom side of the docking station 8, and when the electronic device 2 is separated from the docking station 8 and is used independently, the foot pad 5 can be retracted upward. Thus, height adjustment and convenient use can be achieved.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An electronic device for connection to a docking station, said electronic device comprising:
   a housing body having a rear end to be disposed on the docking station; and
   at least one adjustable mechanism disposed at a front end portion of said housing body, and including
      a foot pad which extends downwardly through said housing body, and which is movable upwardly and downwardly relative to said housing body between a retracted position, where a bottom side of said foot pad is at a level higher than that of the docking station, and an extended position, where said bottom side of said foot pad is at a same level as that of the docking station, and
      a movable engaging hook which is mounted slidably on an inner side of said housing body, and which is partially exposed from said housing body for manipulation, said movable engaging hook being movable horizontally relative to said housing body between a limiting position and a free position, said movable engaging hook interferingly engaging said foot pad when said movable engaging hook is at the limiting position and when said foot pad is at either one of the retracted position and the extended position, said movable engaging hook being disengaged from said foot pad when said movable engaging hook is at the free position so as to enable said foot pad to move between the retracted position and the extended position.

2. The electronic device of claim 1, wherein said movable engaging hook includes a hook body, and two resilient arms connected respectively to left and right sides of said hook body and located respectively at left and right sides of said foot pad, said resilient arms being interferingly engaged with said foot pad when said movable engaging hook is at the limiting position and when said foot pad is at either one of the retracted and extended positions.

3. The electronic device of claim 2, wherein said foot pad includes a pad body having two first limiting portions formed respectively at left and right sides thereof, and a plurality of stop flanges formed at a top edge thereof, said resilient arms respectively engaging said first limiting portions when said foot pad is at the retracted position and when said movable engaging hook is at the limiting position, said stop flanges of said pad body abutting against said inner side of said housing body and said resilient arms resting on said top edge of said pad body when said foot pad is at the extended position and when said movable engaging hook is at the limiting position.

4. The electronic device of claim 3, wherein said movable engaging hook further includes an engaging portion extending from said hook body toward said foot pad and disposed between said resilient arms, said engaging portion being interferingly engaged with said foot pad when said movable engaging hook is at the limiting position and when said foot pad is at either one of the retracted and extended positions.

5. The electronic device of claim 4, wherein said pad body is formed with a second limiting portion, said engaging portion engaging said second limiting portion when said foot pad is at the retracted position and when said movable engaging hook is at the limiting position, said engaging portion resting on said top edge of said pad body when said movable engaging hook is at the limiting position and when said foot pad is at the extended position.

6. The electronic device of claim 2, wherein said inner side of said housing body is provided with two first beveled portions, and each of said resilient arms is formed with a second beveled portion, said resilient arms being guided to move in a direction away from said foot pad so as to be disengaged from said foot pad by virtue of guidance cooperatively provided by said first and second beveled portions when said movable engaging hook is moved from the limiting position to the free position.

7. The electronic device of claim 6, wherein said adjustable mechanism further includes a biasing member to bias said movable engaging hook to the limiting position.

8. The electronic device of claim 7, wherein said inner side of said housing body is formed with a stop block, said movable engaging hook further including a post extending from said hook body in a direction away from said foot pad, said biasing member being sleeved around said post and having two ends respectively abutting against said hook body and said stop block.

9. The electronic device of claim 6, wherein said inner side of said housing body is provided with a first guiding portion, and said hook body is formed with a second guiding portion to cooperate with said first guiding portion to guide said movable engaging hook to move relative to said housing body.

10. The electronic device of claim 3, wherein said foot pad further includes a cushioning block connected to a bottom side of said pad body.

11. The electronic device of claim 10, wherein said pad body is formed with two engaging holes, said cushioning block being formed with two engaging block portions to respectively engage said engaging holes.

12. An adjustable mechanism for a housing body of an electronic device, said adjustable mechanism comprising:
a foot pad which is disposed to extend downwardly through the housing body, and which is movable upwardly and downwardly relative to the housing body between a retracted position and an extended position; and
a movable engaging hook which is disposed to be mounted slidably on an inner side of the housing body, and which is partially exposed from the housing body for manipulation, said movable engaging hook being movable horizontally relative to the housing body between a limiting position and a free position, said movable engaging hook interferingly engaging said foot pad when said movable engaging hook is at the limiting position and when said foot pad is at either one of the retracted position and the extended position, said movable engaging hook being disengaged from said foot pad when said movable engaging hook is at the free position so as to enable said foot pad to move between the retracted position and the extended position.

13. The adjustable mechanism of claim 12, wherein said movable engaging hook includes a hook body, and two resilient arms connected respectively to left and right sides of said hook body and located respectively at left and right sides of said foot pad, said resilient arms being interferingly engaged with said foot pad when said movable engaging hook is at the limiting position and when said foot pad is at either one of the retracted and extended positions.

14. The adjustable mechanism of claim 13, wherein said foot pad includes a pad body having two first limiting portions formed respectively at left and right sides thereof, and a plurality of stop flanges formed at a top edge thereof, said resilient arms respectively engaging said first limiting portions when said foot pad is at the retracted position and when said movable engaging hook is at the limiting position, said stop flanges of said pad body being disposed to abut against the inner side of the housing body and said resilient arms resting on said top edge of said pad body when said foot pad is at the extended position and when said movable engaging hook is at the limiting position.

15. The adjustable mechanism of claim 14, wherein said movable engaging hook further includes an engaging portion extending from said hook body toward said foot pad and disposed between said resilient arms, said engaging portion being interferingly engaged with said foot pad when said movable engaging hook is at the limiting position and when said foot pad is at either one of the retracted and extended positions.

16. The adjustable mechanism of claim 15, wherein said pad body is formed with a second limiting portion, said engaging portion engaging said second limiting portion when said foot pad is at the retracted position and when said movable engaging hook is at the limiting position, said engaging portion resting on said top edge of said pad body when said movable engaging hook is at the limiting position and when said foot pad is at the extended position.

17. The adjustable mechanism of claim 13, the inner side of the housing body being provided with two first beveled portions, wherein each of said resilient arms is formed with a second beveled portion, said resilient arms being guided to move in a direction away from said foot pad so as to be disengaged from said foot pad by virtue of guidance cooperatively provided by the first beveled portions and said second beveled portions when said movable engaging hook is moved from the limiting position to the free position.

18. The adjustable mechanism of claim 17, further comprising a biasing member to bias said movable engaging hook to the limiting position.

19. The adjustable mechanism of claim 18, the inner side of the housing body being formed with a stop block, wherein said movable engaging hook further includes a post extending from said hook body in a direction away from said foot pad, said biasing member being sleeved around said post and having two ends respectively abutting against said hook body and the stop block.

20. The adjustable mechanism of claim 17, the inner side of the housing body being provided with a first guiding portion, wherein said hook body is formed with a second guiding portion to cooperate with the first guiding portion to guide said movable engaging hook to move relative to the housing body.

21. The adjustable mechanism of claim 14, further comprising a cushioning block connected to a bottom side of said pad body.

22. The adjustable mechanism of claim 21, wherein said pad body is formed with two engaging holes, said cushioning block being formed with two engaging block portions to respectively engage said engaging holes.

* * * * *